United States Patent [19]

Kumasaka et al.

[11] Patent Number: 4,610,935

[45] Date of Patent: Sep. 9, 1986

[54] MAGNETIC FILM STRUCTURE

[75] Inventors: Noriyuki Kumasaka, Ome; Hideo Fujiwara, Tokorozawa; Noritoshi Saito, Hachioji; Shigekazu Otomo, Sayama; Takeo Yamashita, Hachioji; Mitsuhiro Kudo, Tokyo, all of Japan

[73] Assignee: Hitachi, Ltd., Tokyo, Japan

[21] Appl. No.: 571,099

[22] Filed: Jan. 16, 1984

[30] Foreign Application Priority Data

Jan. 17, 1983 [JP] Japan .................................. 58-4270

[51] Int. Cl.⁴ ...................... B32B 15/00; B32B 15/04; G11B 5/62; G11B 5/127
[52] U.S. Cl. .................................. 428/632; 428/635; 428/678; 428/679; 428/926; 428/928
[58] Field of Search ............... 428/611, 928, 678, 679, 428/630, 631, 632, 682, 620, 635, 926; 204/192 M; 360/134, 135, 126

[56] References Cited

U.S. PATENT DOCUMENTS

| | | | |
|---|---|---|---|
| 3,673,353 | 6/1972 | Tiemann et al. | 360/126 |
| 3,829,372 | 8/1974 | Heller | 204/192 M |
| 4,156,882 | 5/1979 | Delagi et al. | 360/126 |
| 4,364,020 | 12/1982 | Lin et al. | 336/212 |

FOREIGN PATENT DOCUMENTS

| | | | |
|---|---|---|---|
| 25410 | 3/1978 | Japan | 360/126 |
| 30841 | 3/1980 | Japan | 428/928 |
| 58125 | 5/1981 | Japan | 360/126 |
| 64319 | 4/1982 | Japan | 360/126 |
| 100619 | 6/1982 | Japan | 360/126 |
| 128018 | 7/1983 | Japan | 360/126 |

*Primary Examiner*—L. Dewayne Rutledge
*Assistant Examiner*—John J. Zimmerman
*Attorney, Agent, or Firm*—Antonelli, Terry & Wands

[57] ABSTRACT

A magnetic film structure comprises at least one magnetic film unit wherein a plurality of main magnetic films of 0.05 to 0.5 μm thickness made of a magnetic alloy containing iron or cobalt as principal constituent and having a high saturation magnetic induction of 10,000 gauss or more and a magnetostriction of $10^{-6}$ or less are laminated through intermediate magnetic films made of a magnetic material such as a nickel and iron alloy or amorphous magnetic alloy different from that of the main magnetic film and being so thin that the influence of coercive force of the intermediate magnetic film does not come out. A plurality of the magnetic film units are also laminated through non-magnetic insulating films. The magnetic film structure has high saturation magnetic induction and low coercive force.

24 Claims, 11 Drawing Figures

MAGNETIC FILM STRUCTURE

This invention relates to a magnetic film structure having high saturation magnetic induction and low coercive force so as to provide good results when used for a magnetic head core especially of the type which has performance suitable for high density magnetic recording.

With drastic progress in high density magnetic recording, a metal powder tape has been developed which can facilitate attainment of a higher coercive force Hc of 1,200 to 1,600 Oe than a coercive force of 600 to 700 Oe of a conventional iron oxide power tape. In order to obtain satisfactory record on such a high coercive force recording medium, a magnetic head is required which is made of a magnetic material having a high saturation magnetic induction. A magnetic material of an alloy containing iron, cobalt or nickel as principal constituent can easily be prepared, having a high saturation magnetic induction of 10,000 gauss or more.

Conventionally, when preparing a magnetic head or the like by utilizing a metallic magnetic material, magnetic films are laminated with electrical insulation therebetween in order to suppress eddy current loss in high frequency ranges. The laminated magnetic film structure is prepared by so-called thin film formation technique such as sputtering, vacuum evaporation, ion plating or plating.

Figure 1:
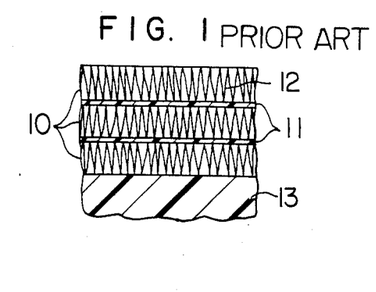
FIG. 1 is a sectional view showing a prior art laminated magnetic film structure.

FIG. 1 shows a prior art laminated magnetic film structure. This known laminated structure is prepared by alternate and successive formation of magnetic films 10 and non-magnetic insulating films 11 on a non-magnetic insulating substrate 13. Each of the magnetic films 10 has a thickness of several microns and each of the non-magnetic insulating films 11 has a thickness which is about 1/10 of the thickness of the magnetic film 10. However, since the crystalline metallic magnetic film behaves itself like a columnar structure as shown at 12 in FIG. 1, it is difficult for magnetization to move through the boundary of the columnar structure and hence the laminated structure exhibits a large coercive force. In a magnetic head prepared with the magnetic films of such a large coercive force, there arises a problem that a magnetic head core is magnetized when a large external magnetic field is applied thereto.

An approach to this problem is such that magnetic film of a thickness of submicrons and non-magnetic films of about 1,000 Å thickness are alternately laminated to thereby reduce the coercive force. For example, while an about 1 $\mu$m thickness single layer film of an alloy of iron and 6.5 weight % silicon (hereinafter, weight % will be simply referred to as %) prepared by sputtering has a coercive force of several oersteds, the laminated structure according to the above proposal can reduce the coercive force to about 1 Oe. A minimum coercive force obtained with this proposed structure will however be 0.8 Oe and for this reason, the proposed structure is sometimes unsatisfactory for the magnetic head material.

The following references are cited to show the state of the art; Japanese Utility Model Application Laid-open No. 58613/77 and Japanese Patent Application Laid-open No. 54408/77.

An object of this invention is to provide a magnetic film structure having a high saturation magnetic induction and a lower coercive force than that of the prior art structure.

Another object of this invention is to provide a magnetic film structure for use in a magnetic head which can exhibit an excellent recording and reproducing characteristic in relation to a high coercive force recording medium.

Still another object of this invention is to provide a laminated magnetic film structure comprised of laminated magnetic films of high saturation magnetic induction which can exhibit low coercive force and high permeability.

Specifically, in accordance with teachings of this invention, crystalline metallic magnetic films having a high saturation magnetic induction of 10,000 gauss or more are used for easy formation of a magnetic film structure having a low coercive force which can not be obtained from the prior art laminated magnetic film structure in which magnetic films and non-magnetic insulating films are laminated alternately.

The inventors of the present application have found that such a magnetic film structure can be materialized by replacing the non-magnetic insulating intermediate film interposed between adjacent main magnetic films in the prior art laminated magnetic film structure with magnetic intermediate film different from the main magnetic film. Especially, according to the findings, the magnetic intermediate film is preferably made of a magnetic material having a relatively low coercive force (less than 10 Oe) and a low magnetostriction (less than $10^{-6}$).

Thus, in the magnetic film structure according to the present invention, a plurality of main magnetic films of a predetermined thickness made of a metallic magnetic alloy having high saturation magnetic induction and low magnetostriction are laminated through intermediate magnetic films of a predetermined thickness made of a magnetic material different from that of the main magnetic films.

Figure 2:
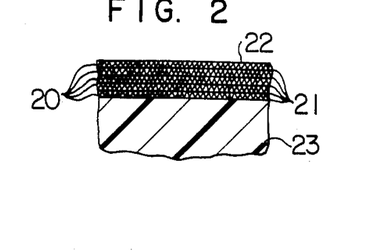
FIG. 2 is a sectional view showing a typical example of a laminated magnetic film structure according to the invention.

FIG. 2 shows, in sectional form, a magnetic film structure according to this invention. As shown, the magnetic film structure comprises main magnetic films 20 made of a magnetic alloy containing, for example, iron or cobalt as principal constituent and having a high saturation magnetic induction, intermediate magnetic films 21 made of an alloy having relatively low coercive force and magnetostriction, for example, a nickel and iron alloy (permalloy) or amorphous magnetic alloy, and a non-magnetic substrate 23.

The intermediate magnetic film 21, when made of the alloy, is very thin, amounting to 30 to 500 Å and the main magnetic film 20 has such a thickness as not to be greatly affected by the adverse magnetism of its columnar crystalline structure 22. Consequently, the columnar crystalline structure 22 of the main magnetic film 20 can be sectonalized by the intermediate magnetic film 21. With this magnetic film structure, the magnetization which is otherwise oriented in a direction vertical to the film surface along the columnar structure and the magnetization which is also otherwise difficult to move through the boundary of the columnar structure are both oriented to the interior of the film so as to have ability to move within the film under the application of a small magnetic field, thereby reducing the coercive force. In addition, the intermediate magnetic films 21 presumably assist in aiding the magnetic coupling between the respective main magnetic films 20 to enhance the movement of the magnetization.

Specifically, it is recommended that the main magnetic film of this invention be made of either a magnetic alloy containing iron as principal constituent and one or more elements selected from a group of silicon, aluminum and titanium by 1 to 30% in total or a magnetic alloy containing cobalt as principal constituent and one or more elements selected from a group of iron, vanadium, titanium and tin. Either alloy has a low magnetostriction (less than $10^{-6}$) and a high saturation magnetic induction (more than 10,000 gauss). If the magnetostriction exceeds $10^{-6}$, the magnetic characteristic disadvantageously will become increasingly irregular under the application of stress and if the saturation magnetic induction is not greater than 10,000 gauss, satisfactory recording on a medium of large coercive force will disadvantageously be prevented. For the sake of improving corrosion-proof and abrasion-proof properties and controlling magnetostriction, the alloy composition of the main magnetic film may be added with an additive by less than 10%. When the magnetic film structure is used in a magnetic head associated with a magnetic recording medium having a high coercive force of 1,200 Oe or more, the main magnetic film preferably has a saturation magnetic induction of more than 10,000 gauss and a coercive force of less than 10 Oe.

On the other hand, the intermediate magnetic film made of a nickel and iron alloy (permalloy) or amorphous magnetic alloy preferably has an alloy composition which exhibits a low coercive force (less than 10 Oe) and a low magnetostriction (less than $10^{-6}$). However, as far as the magnetic material of the intermediate magnetic film is different from that of the main magnetic film, namely, the former material contains an element as principal constituent different from that of the latter material or has an atomic configuration different from that of the latter material, attainment of effects of the present invention can be expected. If the same alloy is used for both the intermediate and main magnetic films, the columnar structure of the intermediate magnetic film and that of the main magnetic film are linked together and good results can not be obtained. The amorphous magnetic alloy is free from this problem and preferably employed in the present invention.

If the intermediate magnetic film is excessively thick, then the influence of its coercive force becomes predominant, thus making it difficult to materialize a laminated magnetic film structure having low coercive force and high permeability. Accordingly, the thickness of the intermediate magnetic film is selected to a value which can substantially eliminate the influence of its coercive force upon the laminated magnetic film structure. Thus, with the intermediate magnetic film having a low coercive force (less than 10 Oe) and a thickness of 30 to 500 Å as described above, a fine structure of multilayer magnetic films can be realized relatively easily. For example, when a magnetic material having a relatively high coercive force such as cobalt or nickel is used for the intermediate magnetic film, it is preferable that the thickness of the intermediate magnetic film be 10 to 80 Å.

As described above, the magnetic film structure of the present invention preferably has a laminated structure comprising a plurality of main magnetic films containing iron or cobalt as principal constituent and having a high saturation magnetic induction, and intermediate magnetic films made of a nickel and iron alloy or amorphous magnetic alloy and each interposed between adjacent main magnetic films.

The present invention can effectively improve a crystalline magnetic film structure in which the magnetic film exhibits the columnar (or needle-like) structure when it takes the form of a single-layer film. In particular, the coercive force can be reduced by about one order by applying teachings of the present invention to a magnetic film structure in which the magnetic film in the form of a single layer has a coercive force of the order of several oersteds.

Preferably, the thickness of each main magnetic film ranges from 0.05 μm to 0.5 μm, most preferably, 0.05 μm to 0.3 μm. For the thickness being less than 0.05 μm, the magnetic characteristic of the intermediate magnetic film comes out and if the intermediate magnetic film is reduced in thickness, film homogeneity will be impared to prevent realization of a stable fine structure. For the thickness being more than 0.5 μm, the influence of the columnar structure becomes predominant to increase the coercive force.

Preferably, the thickness of each intermediate magnetic film ranges from 30 Å to 500 Å, most preferably, 50 Å to 300 Å when the intermediate magnetic film is made of the nickel and iron alloy or amorphous magnetic alloy, having a coercive force of 10 Oe or less. For the thickness being less than 30 Å, effects of the magnetic properties of the intermediate magnetic film are diluted whereas for the thickness being more than 500 Å, the magnetic characteristic of the intermediate magnetic film is enhanced to increase the coercive force. For the same reasons, the intermediate magnetic film preferably has a thickness which ranges from 10 Å to 80 Å, most preferably, 15 Å to 70 Å when it is made of a material having a relatively high coercive force such as cobalt. The laminated magnetic film structure of the present invention wherein the main magnetic films and the intermediate magnetic films are laminated as described previously can provide a lower coercive force than that of the prior art laminated magnetic film structure wherein the main magnetic films and the non-magnetic insulating intermediate films are laminated.

Preferably, the intermediate magnetic film is made of a nickel and iron alloy having a magnetostriction of $1 \times 10^{-6}$ or less which contains, for example, about 81% nickel and about 91% iron. When the intermediate magnetic film is made of an amorphous magnetic alloy, it is preferable that, for example, cobalt be added with one or more elements selected from a group of zirconium, titanium, molybdenum, niobium, tungsten, aluminum, nickel, chromium, silicon and boron or cobalt, iron and nickel be added with silicon, boron and phosphorus, respectively, to provide a coercive force of several oersteds or less. The addition of such additives as above is not limitative. In the case of the amorphous magnetic alloy, crystallization takes place as the temperature rises beyond a crystallization temperature and the coercive force increases abruptly. As a result, it happens that the magnetic characteristic of the intermediate magnetic film comes out to increase the coercive force of the laminated magnetic film structure to an undesirable extent. Therefore, the crystallization temperature is desired to be high.

Generally, when the coercive force of the intermediate magnetic film exceeds 10 Oe, the prepared laminated magnetic film structure is affected by the excessive coercive force, making it difficult to obtain a low coercive force.

The number of laminated main magnetic films and intermediate magnetic films is determined in accordance with the thickness of the laminated magnetic film structure adapted for utilization and purpose of the structure and the thus determined number cooperates with the thickness of each film to provide an intended characteristic.

In accordance with teachings of the present invention, a thick laminated magnetic film structure having excellent high frequency magnetic properties can also be materialized by laminating a predetermined number of laminated magnetic film units of a suitable thickness each comprised of the main magnetic films and intermediate magnetic films through non-magnetic insulating films such as $SiO_2$ films or $Al_2O_3$ films having electrical insulation. The number of the laminated films in the laminated magnetic film unit and the number of the laminated magnetic film units in the thick laminated magnetic film structure are determined in accordance with the thickness of the thick laminated magnetic film structure adapted for utilization and purpose of the structure and the thus determined number cooperates with the thickness of the main magnetic film, intermediate magnetic film and non-magnetic insulating film to provide an intended characteristic.

The non-magnetic insulating film normally has a thickness which ranges from 0.05 μm to 1 μm. For the thickness being more than 1 μm, the magnetic properties such as permeability are degraded whereas for the thickness being less than 0.05 μm, the formation of a complete film becomes difficult, resulting in insufficient interlayer insulation.

Each of the laminated magnetic film units to be laminated through the non-magnetic insulating films normally has 10 to 50 main magnetic films which are laminated through the intermediate magnetic films. Preferably, about 30 main magnetic films are used to obtain a thick laminated magnetic film structure having excellent high frequency magnetic properties.

The present invention will be apparent from the following detailed description taken in conjunction with the accompanying drawings, in which.

The invention will now be described by way of example.

Figure 3:
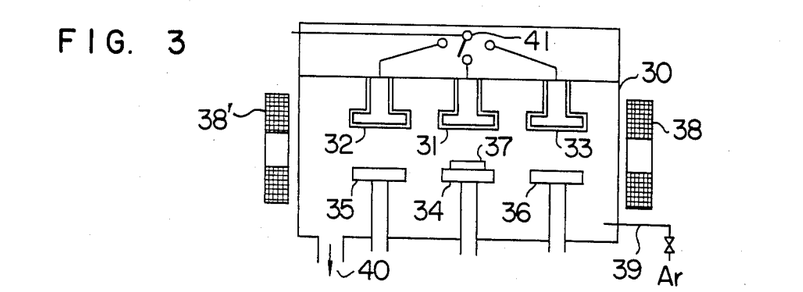
FIG. 3 is a schematic diagram showing a sputtering device used for preparation of a magnetic film structure according to an embodiment of the invention.

An RF sputtering apparatus as shown in FIG. 3 is used for preparing the magnetic film structure. Three independent sets of opposing electrodes are provided inside a vacuum container 30. Electrodes 31, 32 and 33 are target electrodes (cathodes). An alloy target containing iron or cobalt as principal constituent for formation of the main magnetic film is disposed on the electrode 31, an alloy target made of an nickel and iron alloy (permalloy) or amorphous magnetic alloy for formation of the intermediate magnetic film is disposed on the electrode 32, and a target made of an insulating material such as $SiO_2$ or $Al_2O_3$ for formation of the non-magnetic insulating film is disposed on the electrode 33. Electrodes 34, 35 and 36 respectively provided directly beneath the electrodes 31, 32 and 33 are substrate electrodes (anodes). A specimen 37 may be carried on any one of the substrate electrodes as necessary. Also, if necessary, a magnetic field may be applied in parallel to the surface of the specimen 37 by means of electromagnets 38 and 38' during sputtering so that the direction of easy magnetization of the magnetic film structure to be formed may be oriented in parallel to the surface of the film. Electric discharge is effected within an atmosphere of argon gas which is introduced into the vacuum container 30 via a gas inlet pipe 39. An evacuation pipe 40 is provided for the vacuum container 30, and a switch 41 is adapted to switch the electrodes.

EXAMPLE 1

Preparation of an iron and 6.5% silicon film standing for the main magnetic film will first be described.

The following are various condition selected for sputtering under a relatively good condition.

| Target composition | iron and 7.5% silicon |
|---|---|
| RF power density | 2.8 W/cm$^2$ |
| Argon pressure | $2 \times 10^{-2}$ Torr |
| Substrate temperature | 350° C. |
| Anode-cathode separation distance (representing hereinafter the distance between target electrode and substrate electrode) | 25 mm |
| Film thickness | 1.5 μm (for reference) 0.1 μm (this example) |

A single layer film of 1.5 μm thickness thus formed on the non-magnetic substrate has magnetic properties including a coercive force Hc of 2.5 Oe, a permeability μ of 400 at 5 MHz, and a saturation magnetic induction of 18,500 gauss. Sputtering is effected under the application of a magnetic field (about 10 Oe) oriented in one direction parallel to the surface of the magnetic film. These magnetic properties are measured in the direction of hard magnetization which is vertical to the surface of the magnetic film. A glass substrate is used as the non-magnetic substrate. Of various conditions for sputtering, the silicon content in the targe must be excessive since the composition in a resulting sputtered film tends to shift to the iron content in comparison with the composition in the target. As the RF power density increases beyond 2 W/cm$^2$, the coercive force Hc tends to decrease. The substrate temperature is preferably above 250° C. to mitigate stress in the film. As the anode-cathode separation distance decreases, the coercive force tends to become low but in consideration of stability of electric discharge during sputtering, the distance is preferably about 20 to 30 mm. Preferably, the vacuum container is highly evacuated to a vacuum degree of the order of $10^{-7}$ Torr prior to the introduction of argon gas since the remaining oxygen and impurity will adversely affect the magnetic properties of the magnetic film structure.

Typically, the intermediate magnetic film is prepared by RF sputtering under the following conditions.

| Target material | 83% nickel and 17% iron |
|---|---|
| RF power density | 0.5 W/cm$^2$ |
| Argon pressure | 5 × 10$^{-3}$ Torr |
| Substrate temperature | 250° C. |
| Anode-cathode separation distance | 50 mm |
| Film thickness | 100 Å |

A thus prepared intermediate magnetic film approximately has a composition of 81% nickel and 19% iron. A laminated magnetic film structure having 15 laminated main magnetic films is thus prepared, having a total thickness of about 1.5 μm with each of the main magnetic films formed in 0.1 μm thickness and each of the intermediate magnetic films formed in 100 Å thickness.

Another intermediate magnetic film is prepared by using an amorphous magnetic alloy under the following conditions.

| Target material | $Co_{80}Mo_{9.5}Zr_{10.5}$, $Co_{82}Nb_{13}Zr_5$, $Co_{59}W_5Zr_6$, $Co_{81}Ti_{19}$ |
|---|---|
| RF power density | 0.8 W/cm$^2$ |
| Argon pressure | 5 × 10$^{-3}$ Torr |
| Substrate temperature | 150° C. |
| Anode-cathode separation distance | 50 mm |
| Film thickness | 100 Å |

For reference, an intermediate magnetic film of SiO$_2$ or molybdenum is also prepared.

When preparing the intermediate magnetic film by using the amorphous magnetic alloy, the substrate temperature is set to 250° C. during sputtering of the main magnetic films.

Table 1 shows magnetic properties of the laminated magnetic film structure having the thus prepared main magnetic films of iron and 6.5% silicon alloy and various kinds of intermediate magnetic films as listed in Table 1. Magnetic properties of a plurality of structures immediately after sputtering are averaged and indicated in Table 1. Item (a) represents properties of single layer films of iron and 6.5% silicon alloy, items (b) and (c) represent properties of laminated magnetic film structures having the prior art non-magnetic insulating intermediate films, and items (d) to (h) represent properties of laminated magnetic film structures having intermediate magnetic films of permalloy or amorphous magnetic alloy according to teachings of the present invention. As will be seen from the results shown in Table 1, the laminated magnetic film structures having the intermediate magnetic films according to the invention have an extremely lower coercive force than that of the prior art laminated magnetic film structures having the non-magnetic insulating intermediate films. Specifically, according to the present invention, the coercive force is reduced to below 0.5 Oe to provide a practically significant permeability.

TABLE 1

| | | Magnetic properties | | |
|---|---|---|---|---|
| | | Coercive force Hc(Oe) | Permeability μ (at 5 MHz) | Saturation magnetic induction Bs(G) |
| (a) Single layer film | | 2.5 | 400 | 18,500 |
| Intermediate films of laminated structure | Non-magnetic material | | | |
| | (b) SiO$_2$ | 1.0 | 2,000 | 18,000 |
| | (c) Mo | 0.9 | 900 | 18,000 |
| | (d) Ni—19% Fe | 0.4 | 2,400 | 18,000 |
| | Amorphous magnetic alloy | | | |
| | (e) $Co_{80}$—$Mo_{9.5}$—$Zr_{10.5}$ | 0.4 | 2,400 | 17,000 |
| | (f) $Co_{82}$—$Nb_{13}$—$Zr_5$ | 0.45 | 2,450 | 18,000 |
| | (g) $Co_{89}$—$W_5$—$Zr_6$ | 0.5 | 2,200 | 18,500 |
| | (h) $Co_{81}$—$Ti_{19}$ | 0.4 | 2,100 | 17,000 |

According to the present invention, each of the main magnetic films can have a thickness which ranges from 0.05 μm to 0.5 μm to ensure that the columnar structure can be sectionalized to an extent that the magnetic properties of the laminated magnetic film structure are not affected adversely.

Figure 4:
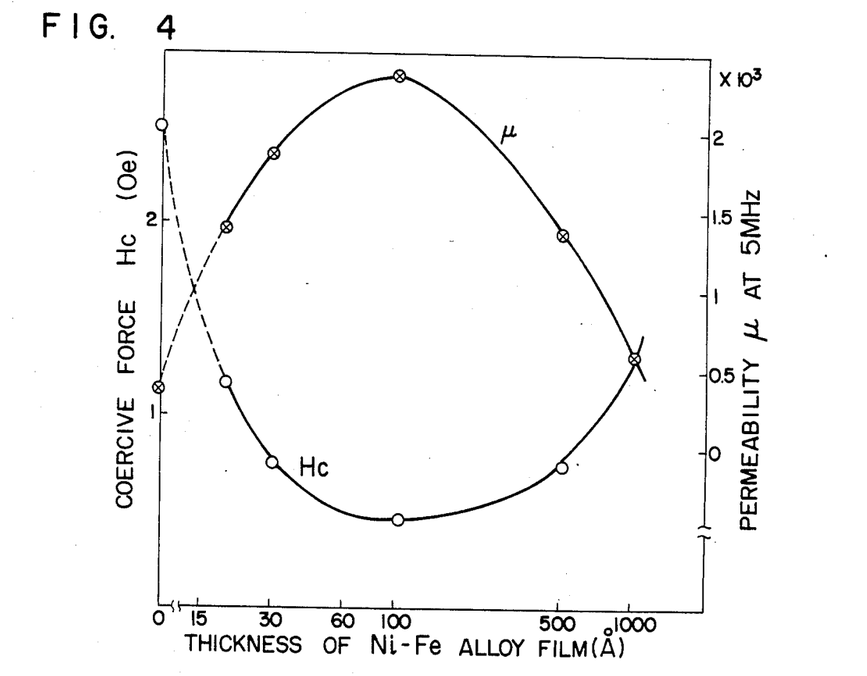
FIGS. 4 and 5 are graphs showing magnetic characteristics of a laminated magnetic film structure embodying the invention which comprises main magnetic films made of an iron and 6.5% silicon alloy and intermediate magnetic films or spacers of permalloy.

FIG. 4 shows the relation between the thickness of the intermediate film or spacer, coercive force Hc and permeability μ at 5 MHz when the main magnetic film of iron and 6.5% silicon alloy has a thickness of 0.1 μm and the intermediate magnetic film is made of permalloy. The laminated magnetic film structure has 15 main magnetic films and the intermediate magnetic films interposed between adjacent main magnetic films. It will be seen from FIG. 4 that the coercive force is about 0.8 Oe for the thickness of the intermediate magnetic film which ranges from 30 Å to 500 Å, is less than 0.5 Oe for the thickness range of 50 to 300 Å and is minimum near 100 Å. The permeability, on the other hand, becomes maximum near 100 Å. Although the influence of the thickness of the intermediate magnetic film slightly differs depending on the type of material of the intermediate magnetic film and the thickness of each of the main magnetic films, the range for preferable coercive force substantially coincides with the range for preferable permeability. For the thickness being less than 30 Å, the magnetic properties of the intermediate magnetic film are diluted to increase the coercive force whereas for the thickness being less than 10 Å, it is difficult to block the columnar structure in the main magnetic film, allowing the columnar structure to grow, whereby the effects of the present invention are degraded.

For the thickness of the intermediate magnetic film being more than 500 Å, on the other hand, the magnetic properties of the intermediate magnetic film comes out to increase the coercive force and decrease the saturation magnetic induction of the main magnetic film even when the main magnetic film inherently has a high saturation magnetic induction. Since the thickness of the intermediate magnetic film is difficult to directly measure, it is calculated from theoretical sputtering rate when the alloy is deposited to a thickness of several microns and controlled in terms of time.

Because of the coercive force of the intermediate magnetic film being less than 10 Oe in this example, the thickness can be set to a range which is relatively easy to control, bringing out significant, practical effects.

Figure 5:
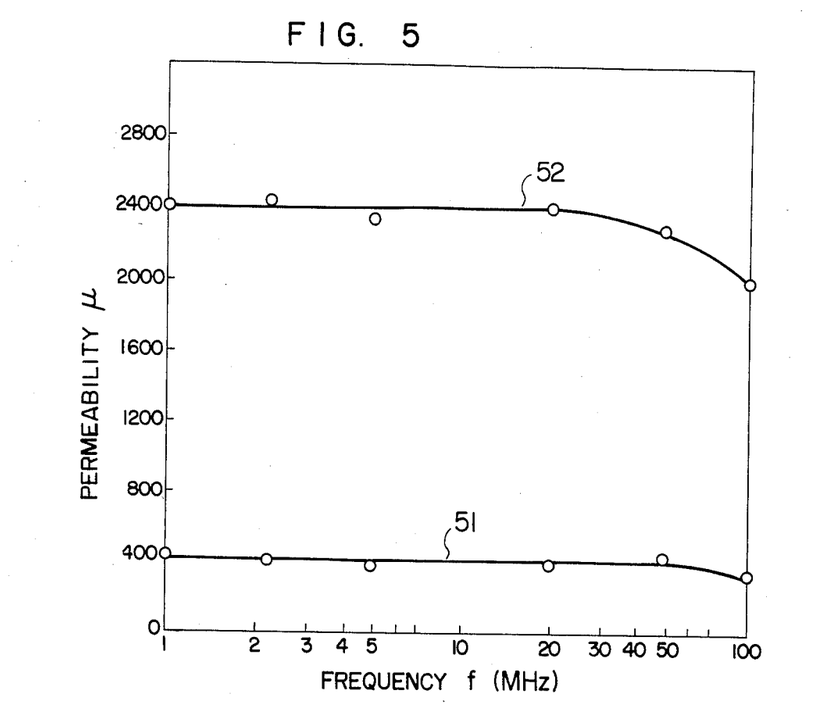

In this example, a magnetic field is applied in one direction parallel to the surface of the main magnetic film during sputtering so that the direction of easy magnetization is established which coincides with the direction of the applied magnetic field. As shown in FIG. 5, when the frequency of magnetic field is varied, the permeability (represented by curve 51) is measured in the direction of the applied magnetic field (direction of easy magnetization) and the permeability (represented by curve 52) is measured in the direction vertical to the applied magnetic field (direction of hard magnetization). It will be seen that the latter permeability is higher than the former. Accordingly, in a magnetic head incorporating the laminated magnetic film structure of the present invention, its direction of hard magnetization can be arranged in an advantageous direction with respect to a magnetic circuit for the magnetic head.

EXAMPLE 2

Another example of the present invention will be described hereunder.

For example, when sputtering a target of cobalt and 12% iron alloy under the following conditions to prepare a laminated magnetic film structure having main magnetic films of cobalt and 12% iron alloy, a resulting single layer structure exhibits a coercive force of several of tens of oersteds whereas a resulting structure according to the present invention exhibits a coercive force which is reduced to 1 Oe or less. Since the cobalt and iron alloy inherently has a high coercive force, the film thickness needs to be reduced slightly.

| | |
|---|---|
| Target composition | Co—12% Fe |
| RF power density | 2.5 W/cm$^2$ |
| Argon pressure | $1 \times 10^{-3}$ Torr |
| Substrate temperature | 150° C. |
| Anode-cathode separation distance | 30 mm |
| Thickness of Co-Fe alloy film | 0.05 μm |
| Composition of intermediate film | Co$_{80}$Mo$_{10}$Zr$_{10}$ |
| Thickness of intermediate film | 80 Å |
| The number of laminated Co-Fe alloy films | 10 |
| The number of intermediate films | 9 |
| Coercive force Hc of laminated magnetic film structure | 1 Oe |
| Saturated magnetic induction of laminated magnetic film structure | 15,000 gauss |

Similar results can be obtained with intermediate magnetic films of permalloy. Sputtering conditions for the intermediate magnetic film are the same as those in Example 1.

The foregoing Examples 1 and 2 clearly indicate that satisfactory effects can be attained whenever the main magnetic film used in the present invention is made of the magnetic alloy which contains iron or cobalt as principal constituent and has a high saturation magnetic induction (more than 10,000 gauss) and a magnetostriction of nearly zero. Especially, in a magnetic film structure wherein the magnetic film prepared by thin film formation technique exhibits a columnar structure which is vertical or oblique to the film surface, the present invention can reduce the coercive force, thereby providing a laminated magnetic film structure suitable for use in a magnetic head.

EXAMPLE 3

Figure 6:
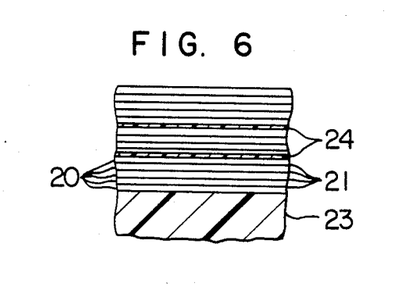
FIG. 6 is a sectional view showing another embodiment of the laminated magnetic film structure.

FIG. 6 shows still another example of the film structure according to the present invention which is a thick laminated magnetic film structure. In this example, a plurality of laminated magnetic film units (prepared in accordance with Examples 1 and 2) each comprised of alternate lamination of main magnetic films 20 and intermediate magnetic films 21 and having a thickness of about 5 microns are laminated on a non-magnetic substrate 23 through second intermediate films of 0.1 μm thickness made of a non-magnetic insulating material such as SiO$_2$ or Al$_2$O$_3$. The thus prepared thick laminated magnetic film structure is free from degradation of permeability in high frequency ranges, thus providing an excellent magnetic head core. In particular, this thick laminated magnetic film structure can be used in a video head having a track width of 10 μm or more.

Figure 7:
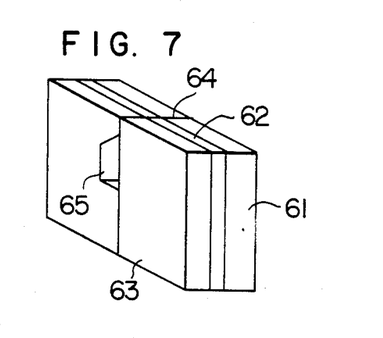
FIGS. 7, 8a and 8b are diagrams useful in explaining a magnetic head incorporating the laminated magnetic film structure.

FIG. 7 shows a magnetic head in which two thick laminated magnetic film structures formed on respective non-magnetic substrates and machined into a predetermined configuration are mated together so that magnetic gap surfaces oppose to each other. A magnetic film structure 62 is formed on a first non-magnetic substrate 61, and a second non-magnetic substrate 63 adapted to protect the magnetic film structure is bonded by glass, for example, to the first substrate or the magnetic film structure. Denoted by 64 is a magnetic gap and 65 is a window for coil winding. In this example, the thickness of the laminated magnetic film structure 62 corresponds to the track width.

Figure 8A:
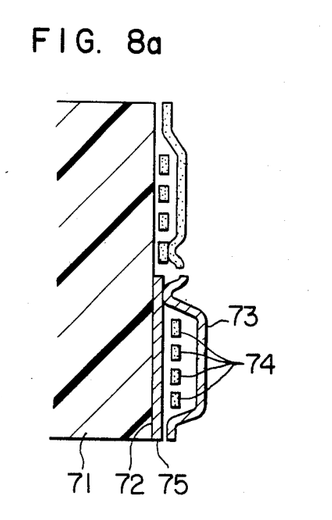
Figure 8B:
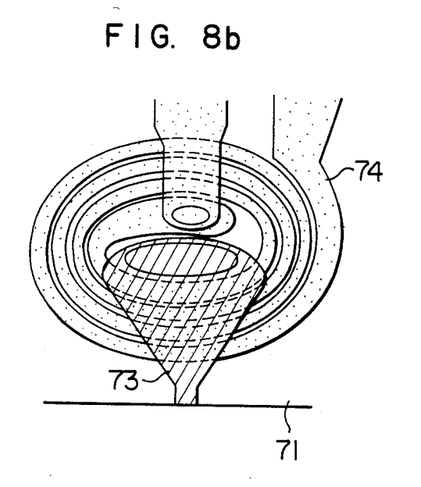

FIGS. 8a and 8b show a magnetic recording thin film head incorporating the laminated magnetic film structure according to the invention, where FIG. 8a illustrates a sectional view of a magnetic head core and FIG. 8b a top view thereof. In FIGS. 8a and 8b, there are illustrated a non-magnetic substrate 71, a lower magnetic film structure, an upper magnetic film structure, a conductor coil 74 and a magnetic gap 75. In this example, the thickness of the magnetic film structure being less than several microns suffices and the non-magnetic insulating film 24 as required for the FIG. 6 example can be dispensed with.

Figure 9A:
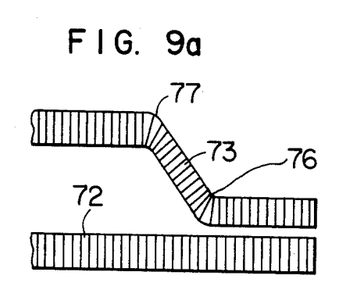
FIGS. 9a and 9b fragmentary enlarged views showing the magnetic film structure near a magnetic gap of a magnetic head to explain effects of the present invention as applied to a magnetic recording thin film head, the former illustrating a case according to the prior art and the latter illustrating a case according to an embodiment of the present invention.
Figure 9B:
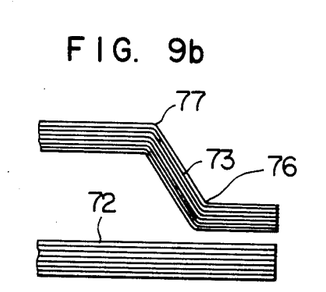

Other effects brought about by the present invention will now be described with reference to FIGS. 9a and 9b which illustrate, in fragmentary enlarged form, a portion of the magnetic film structure near the magnetic gap of the magnetic head shown in FIGS. 8a and 8b. More particularly, illustrated in FIG. 9a are magnetic film structures 72 and 73 which are constituted by a single-layer film having a large columnar structure according to the prior art. In this case, the columnar structure is disturbed at bent portions 76 and 77, causing cracks or corrosion thereat. In addition, stress is concentrated at the bent portions to create cracks thereat. In contrast thereto, in the case of the magnetic head incorporating the laminated magnetic film structures according to the present invention, the crystalline structure is fine and uniformly continuous at the bent portions as shown in FIG. 9b, so that stress concentration at the bent portions can be reduced to suppress the creation of cracks, thereby ensuring provision of a highly corrosion-proof magnetic circuit.

Obviously, many modifications and variations of the present invention are possible in the light of the above teachings. It is therefore to be understood that within the scope of the appended claims, the invention may be practiced otherwise than as specifically described.

We claim:

1. A magnetic film structure for a magnetic head comprising:

a first magnetic film having a thickness which ranges from 0.05 μm to 0.5 μm, said first magnetic film being made of a metallic magnetic alloy having a composition containing iron or cobalt as a principal constituent and a saturation magnetic induction of 10,000 gauss or more and a magnetostriction of $10^{-6}$ or less; and a second magnetic film of a predetermined thickness made of a magnetic material different from that of said first magnetic film, said magnetic material having a low coercive force and a low magnetostriction, said first and second magnetic films being laminated to provide a film structur having a plurality of said first magnetic films and a plurality of said second magnetic films.

2. A magnetic film structure for a magnetic head according to claim 1, wherein said second magnetic film is an alloy film having a coercive force of 10 oersted or less and a magnetostriction of $10^{-6}$ or less and having a thickness which ranges from 30 Å to 500 Å.

3. A magnetic film structure for a magnetic head according to claim 2, wherein said first magnetic film has a coercive force of 10 oersted or less.

4. A magnetic film structure for a magnetic head comprising a plurality of laminated magnetic film units each including a first magnetic film having a thickness which ranges from 0.05 μm to 0.5 μm, said first magnetic film being made of a metallic magnetic alloy having a saturation magnetic induction of 10,000 gauss or more and a magnetostriction of $10^{-6}$ or less, and a second magnetic film having a thickness which ranges from 30 Å to 500 Å, said second magnetic film being made of a nickel-iron alloy or an amorphous magnetic alloy different from said metallic magnetic alloy constituting said first magnetic film, said first and second magnetic films being laminated; and at least one non-magnetic insulating film, said laminated magnetic film units being laminated with a different one of said insulating films being interposed between adjacent two laminated magnetic film units.

5. A magnetic film structure for a magnetic head according to claim 4, wherein each of said non-magnetic insulating films has a thickness of 0.05 to 1 μm.

6. A magnetic film structure for a magnetic head according to claim 5, wherein each non-magnetic insulating film is made of an oxide of metal or a semiconductor element.

7. A magnetic film structure for a magnetic head according to claim 6, wherein each non-magnetic insulating films is made of silicon oxide or aluminum oxide.

8. A magnetic film structure for a magnetic head comprising:

a first magnetic film having a thickness which ranges from 0.05 μm to 0.5 μm, said first magnetic film being made of a metallic magnetic alloy having a saturation magnetic induction of 10,000 gauss or more and a magnetostriction of $10^{-6}$ or less; and a second magnetic film having a thickness which ranges from 30 Å to 500 Å, said second magnetic film being made of a nickel-iron alloy or an amorphous magnetic alloy different from said metallic magnetic alloy constituting said first magnetic film said first and second magnetic films being laminated to provide a film structure having a plurality of said first magnetic films and a plurality of said second magnetic films.

9. A magnetic film structure for a magnetic head according to claim 8, wherein said first magnetic film is an alloy film of a composition containing iron or cobalt as a principal constituent.

10. A magnetic film structure for a magnetic head according to claim 9, wherein said second magnetic film is an alloy film having a coercive force of 10 oersted or less and a magnetostriction of $10^{-6}$ or less.

11. A magnetic film structure for a magnetic head according to claim 10, wherein said first magnetic film has a coercive force of 10 oersted or less.

12. A magnetic film structure for a magnetic head comprising: a plurality of laminated magnetic film units each including a first magnetic film having a thickness which ranges from 0.05 μm to 0.5 μm, said first magnetic film being made of a metallic magnetic alloy having a high saturation magnetic induction and a low magnetostriction, and a second magnetic film having a thickness which ranges from 30 Å to 500 Å, said second magnetic film being made of a nickel-iron alloy or amorphous magnetic alloy different from said metallic magnetic alloy constituting said first magnetic film, and said second magnetic film having a low coercive force and a low magnetostriction, said first and second magnetic films being laminated; and at least one non-magnetic insulating film, said laminated magnetic film units being laminated with different one of said insulating films being interposed between adjacent laminated magnetic film units.

13. A magnetic film structure for a magnetic head according to claim 12, wherein each of said non-magnetic insulating film has a thickness of 0.05 to 1 μm.

14. A magnetic film structure for a magnetic head according to claim 13, wherein said non-magnetic insulating film is made of an oxide of metal or a semiconductor element.

15. A magnetic film structure for a magnetic head according to claim 14, wherein said non-magnetic insulating film is made of silicon oxide or aluminum oxide.

16. A magnetic film structure for a magnetic head comprising:

a first magnetic film having a thickness which ranges from 0.05 μm to 0.5 μm, said first magnetic film being made of a metallic magnetic alloy having a high saturation magnetic induction and a low magnetostriction; and a second magnetic film having a thickness which ranges from 10 Å to 80 Å, said second magnetic film being mainly made of a cobalt or nickel and different from said metallic magnetic alloy constituting said first magnetic film, and said second magnetic film having a low coercive force and a low magnetostriction, said first and second magnetic films being laminated to provide a film structure having a plurality of said first magnetic films and a plurality of said second magnetic films.

17. A magnetic film structure for a magnetic head according to claim 16, wherein said first magnetic film is an alloy film having a saturation magnetic induction of 10,000 gauss or more and a magnetostriction of $10^{-6}$ or less.

18. A magnetic film structure for a magnetic head according to claim 17, wherein said first magnetic film is an alloy film of a composition containing iron or cobalt as a principal constituent.

19. A magnetic film structure for a magnetic head according to claim 18, wherein said second magnetic film is an alloy film having a coercive force of 10 oersted or less and a magnetostriction of $10^{31\ 6}$ or less.

20. A magnetic film structure for a magnetic head according to claim 19, wherein said first magnetic film has a coercive force of 10 oersted or less.

21. A magnetic film structure for a magnetic head comprising: a plurality of laminated magnetic film units each including a first magnetic film having a thickness which ranges from 0.05 $\mu$m to 0.5 $\mu$m, said first magnetic film being made of a metallic magnetic alloy having a high saturation magnetic induction and a low magnetostriction, and a second magnetic film having a thickness which ranges from 10 Å to 80 Å, said second magnetic film being mainly made of a cobalt or nickel and different from said metallic magnetic alloy constituting said first magnetic film, and said second magnetic film having a low coercive force and a low magnetostriction, said first and second magnetic films being laminated; and at least one non-magnetic insulating film, said laminated magnetic film units being laminated with different one of said insulating films being interposed between adjacent two laminated magnetic film units.

22. A magnetic film structure for a magnetic head according to claim 21, wherein each said non-magnetic insulating film has a thickness of 0.05 to 1 $\mu$m.

23. A magnetic film structure for a magnetic head according to claim 22, wherein said non-magnetic insulating film is made of an oxide of metal or a semiconductor element.

24. A magnetic film structure for a magnetic head according to claim 23, wherein said non-magnetic insulating film is made of silicon oxide or aluminum oxide.

* * * * *